US011981881B2

(12) United States Patent
Larracuente et al.

(10) Patent No.: US 11,981,881 B2
(45) Date of Patent: May 14, 2024

(54) TRANSFER OF ENCAPSULATED FRAGRANCE TO FABRICS IN DRYER CYCLE BY MEANS OF WOOL BALL

(71) Applicant: Henkel AG & Co. KGaA, Duesseldorf (DE)

(72) Inventors: Anna Larracuente, Newtown, CT (US); Maxime Pelletier, Sandy Hook, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/301,837

(22) Filed: Apr. 15, 2021

(65) Prior Publication Data

US 2022/0333043 A1 Oct. 20, 2022

(51) Int. Cl.

*C11D 3/50* (2006.01)
*C11D 3/20* (2006.01)
*C11D 3/37* (2006.01)
*C11D 9/44* (2006.01)

(52) U.S. Cl.

CPC ............ *C11D 3/505* (2013.01); *C11D 3/2096* (2013.01); *C11D 3/37* (2013.01)

(58) Field of Classification Search

CPC ........... C11D 3/50; C11D 3/502; C11D 3/505; C11D 3/507; C11D 9/44; C11D 17/041; C11D 17/043

See application file for complete search history.

(56) References Cited

U.S. PATENT DOCUMENTS

| | | | |
|---|---|---|---|
| 4,014,105 A | 3/1977 | Furgal et al. | |
| 4,567,675 A | 2/1986 | Rennie | |
| 7,441,345 B2 | 10/2008 | Taylor | |
| 10,179,968 B2 | 1/2019 | LeBrun et al. | |
| 2014/0115919 A1* | 5/2014 | LeBrun | D06F 60/00 34/523 |
| 2017/0342347 A1* | 11/2017 | Schramm, Jr. | C11D 3/3749 |
| 2019/0309464 A1 | 10/2019 | Caswell et al. | |
| 2021/0054318 A1* | 2/2021 | Piorkowski | C11D 17/046 |
| 2021/0189304 A1* | 6/2021 | Pelletier | C11D 17/0039 |

OTHER PUBLICATIONS

Pelletier; Maxime et al., “Delivery System For Dryer Balls”, U.S. Patent Application filed Dec. 18, 2020, U.S. Appl. No. 17/127,564, United States Patent and Trademark Office, Alexandria, Virginia U.S.

Daniel T. Piorkowski et al., “Multi-Use Laundry Balls”, U.S. Patent Application filed Aug. 21, 2019, U.S. Appl. No. 16/547,548, United States Patent and Trademark Office, Alexandria, Virginia U.S.

* cited by examiner

*Primary Examiner* — Brian P Mruk
(74) *Attorney, Agent, or Firm* — Bojuan Deng

(57) ABSTRACT

An absorbent substrate such as a wool dryer ball is imbued with a fragrance or treatment composition. The fragrance or treatment composition comprises an aqueous carrier, free fragrance, and encapsulated fragrance. The composition includes about 0.1 wt. % to about 5 wt. % free fragrance and about 0.1 wt. % to about 10 wt. % encapsulated fragrance. A kit includes absorbent balls, the fragrance or treatment composition, and an applicator for applying the fragrance or treatment composition onto or within the absorbent balls.

7 Claims, 7 Drawing Sheets

TRANSFER OF ENCAPSULATED FRAGRANCE TO FABRICS IN DRYER CYCLE BY MEANS OF WOOL BALL

FIELD OF THE INVENTION

The present disclosure related to treatment compositions and devices for treating textiles and fabrics. More particularly, the present disclosure relates to a treatment composition for extended release of fragrance from an absorbent substrate such as a dryer ball, and dryer balls containing the treatment composition.

BACKGROUND OF THE INVENTION

Consumers who wash and dry their own laundry want their laundry to be dry, but also to feel soft, be free of static, and have a pleasant smell.

Fabric softener sheets, also known as dryer sheets, typically provide desired effects of fabric softening, static removal, and fragrance to laundry when included with the wet laundry in a clothes dryer. However, dryer sheets are disposable, and are typically discarded by a consumer user after one drying cycle. Some consumers prefer a softening and/or anti-static and/or fragrance product that can be used more than once.

Dryer balls, e.g., wool, plastic, or rubber balls which accompany wet laundry into the dryer, and tumble freely in the dryer drum with the washed fabrics, are commercially available for use as an alternative to dryer sheets. Some consumers choose to dry laundry with dryer balls as a way to shorten drying time of a load of laundry in a dryer, and/or provide fluffing to fabrics, and/or as a less wasteful alternative to dryer sheets. However, dryer balls do not reliably provide fabric softening, static cling prevention, and a pleasant fragrance to laundry.

Some wool dryer balls are available as pre-fragranced wool balls. These pre-fragranced wool balls, however, do not provide a long-lasting fragrance that can be experienced by consumers when the article is worn or used if the laundry is stored for a period of time before wear or other use.

It would be desirable if wool and other dryer balls could be provided with long lasting fragrance that would provide dried clothing and other laundry with a long-lasting pleasant smell which could be experienced by consumers during wear/use of fabrics, even if such wear/use occurs long after drying of the clothing and other laundry.

Accordingly, a need exists for improved devices and methods for providing the aforementioned benefits and additional benefits of less waste and being more environmentally friendly to a substrate used as a dryer ball in a dryer.

SUMMARY OF THE INVENTION

The foregoing is achieved by a treatment composition that can be applied to absorbent substrates such as dryer balls to enable extended fragrance release from fabrics dried using the substrates.

In one aspect, the invention provides a device for treating fabrics and textiles in a dryer comprising an absorbent substrate; and a fragrance composition dispersed on or within the substrate, the fragrance composition comprising free fragrance, and encapsulated fragrance. The substrate contains about 0.02% to about 2.0% by weight of free fragrance and about 0.005% to about 2.5% by weight of encapsulated fragrance, based on a total weight of the substrate without fragrance. In preferred embodiments, the substrate is a wool ball. In certain embodiments, ratio of free fragrance to encapsulated fragrance is about 1:0.3 to 1:2, or 1:1 to about 1:2.

Another aspect of the invention is a treatment composition used on a substrate such as a wool dryer ball, which comprises an aqueous carrier, free fragrance, and encapsulated fragrance. The treatment composition comprises about 0.1 wt. % to about 5 wt. % free fragrance and about 0.1 wt. % to about 10 wt. % encapsulated fragrance. In certain embodiments, a ratio of free fragrance to encapsulated fragrance is about 1:0.3 to 1:2, or about 1:1 to about 1:2. The treatment composition further comprises at least one suspending polymer, which desirably is selected from the group consisting of a hydrophobically-modified alkali swellable emulsion polymer (HASE), an alkali swellable emulsion polymer (ASE), a cationic polymer, an anionic polysaccharide polymer, and any combination thereof. Most preferably, the suspending polymer is a HASE; and comprises about 0.01 wt. % to about 3.0 wt. % of the treatment composition. The composition may further comprise a neutralizing agent and/or an emulsifier, and additionally, one or more of an odor capturing agent, a softening agent, an anti-static agent, a color protection agent, a UV protector, an anti-pilling agent, a disinfecting/sanitizing agent, a scouring agent, and a mosquito repellant, or any combination thereof. The composition may also include one or more of a colorant and/or a salt.

A further aspect of the invention is a kit for treating textiles in a dryer, which comprises one or more absorbent balls; a treatment composition comprising free fragrance, encapsulated fragrance, and an aqueous carrier; and an applicator for applying the treatment composition onto or within the absorbent balls. The balls preferably are comprised of wool. The kit preferably contains a plurality of balls. The applicator is selected from the group consisting of a sprayer, a dropper, and a syringe. In certain embodiments, the applicator is capable of dispensing about 4 g to about 15 grams, more preferably about 6 g to about 12 g of the treatment composition to the ball with each application. In some embodiments, the applicator dispenses an amount of treatment composition sufficient to provide one wool ball with about 0.04% to about 0.85% by weight of free fragrance and about 0.01% to about 1.25% by weight of encapsulated fragrance, based on a total weight of the wool ball without fragrance.

DETAILED DESCRIPTION OF THE INVENTION

The following detailed description is merely exemplary in nature and is not intended to limit the product described, or the method for producing or using the same. Furthermore, there is no intention to be bound by any theory presented in the preceding background or the following detailed description.

As described herein, there is a need for an improved device for providing benefits to laundry for use in a dryer that overcomes the drawbacks of currently available devices and methods. According to various embodiments described herein, the devices described herein provide advantages over the prior art by providing a simple and ecological way to impart one or more benefits to fabrics and garments during a drying cycle. In particular, a number of benefits can be provided to laundry via the re-usable devices and treatment compositions described herein. In embodiments, the consumer can choose the preferred combination of benefits. Such benefits include, but are not limited to: shortened drying time, fluffing of fabrics, softness, fragrance, and static lessening/removal.

The terms "garment," and "laundry" as used herein, encompass all textile and fabric items typically washed in a washing machine and dried in a clothes dryer, and include clothing, as well as kitchen, table, bedroom, and bath fabric items such as sheets, towels, blankets, and other products primarily made of textiles or fabrics.

The terms "fragrance" and "perfume" as used herein are equivalent terms indicating a composition with a pleasant odor.

The term "about" as used in connection with a numerical value throughout the specification and the claims denotes an interval of accuracy, familiar and acceptable to a person skilled in the art. In general, such interval of accuracy is ±10%. Thus, "about ten" means 9 to 11. All numbers in this description indicating amounts, ratios of materials, physical properties of materials, and/or use are to be understood as modified by the word "about," except as otherwise explicitly indicated.

The wt. % amounts in the specification refer to the amounts of an active ingredient in the final beneficial composition. For example, the encapsulated fragrance compositions are typically provided by the vendors as aqueous suspensions, typically at about 30 wt. % solid encapsulates. The active ingredient refers to the solid encapsulates.

Embodiments will now be described in more detail with reference to the Figures.

Absorbent Substrate

Figure 1A:
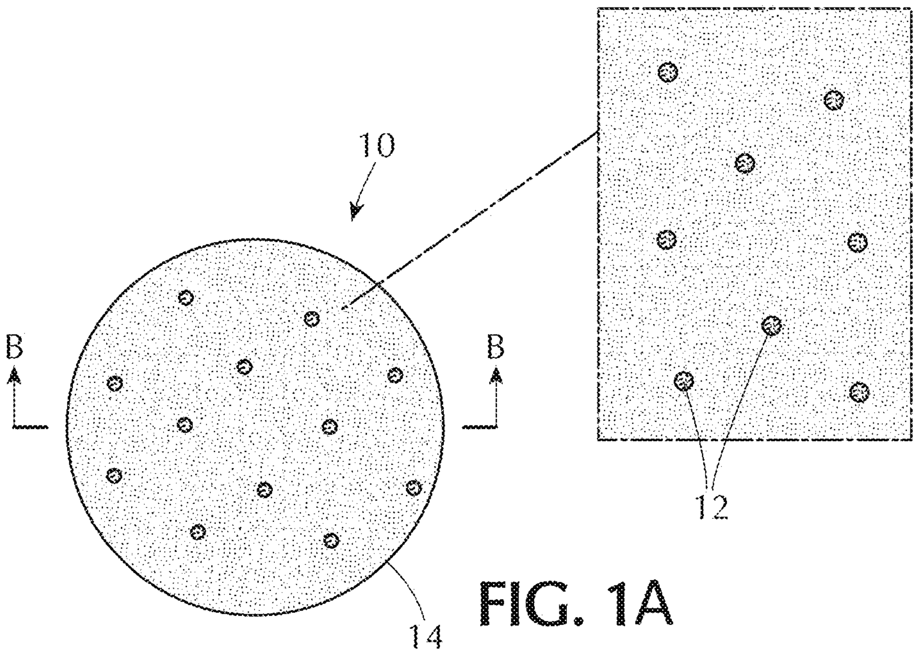
FIG. 1A illustrates an absorbent substrate, specifically, a wool dryer ball according to an embodiment of the invention.

FIG. 1A illustrates an absorbent substrate 10, which has a porous surface, according to one particular embodiment.

Figure 1B:
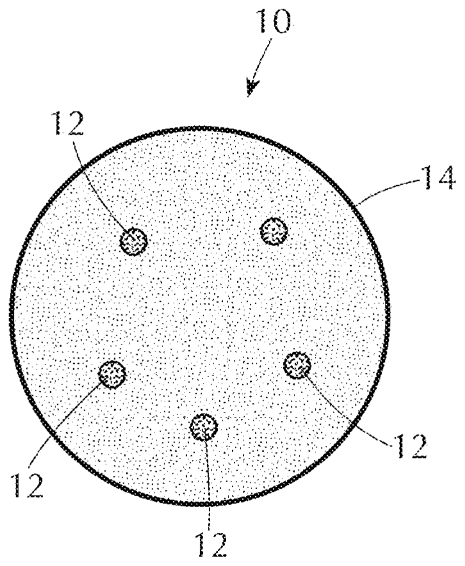
FIG. 1B illustrates a cross-sectional view of the wool dryer ball of FIG. 1A taken along line B-B.
Figure 2A:
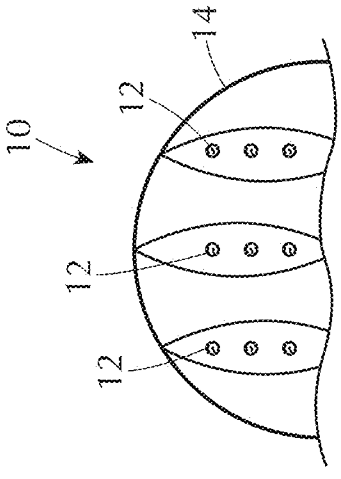
FIG. 2A illustrates a dryer ball with a pattern of treatment composition on the surface of the ball.
Figure 2B:
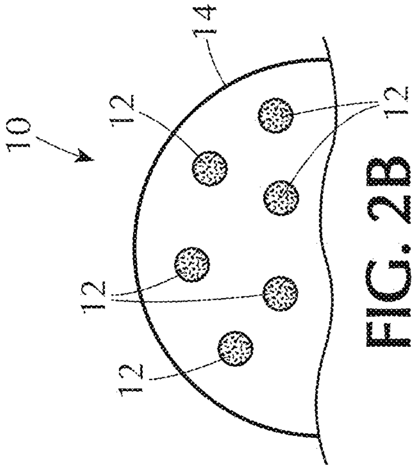
FIG. 2B illustrates a dryer ball with an alternative pattern of treatment composition on the surface of the ball.
Figure 3A:
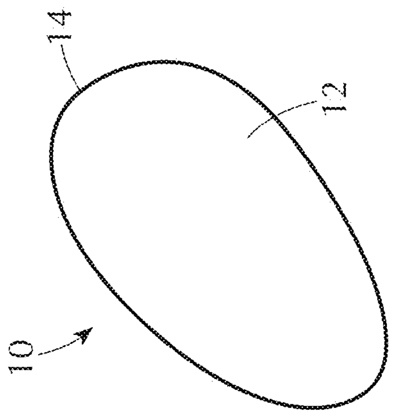
FIGS. 3A-3C illustrate alternative shapes of absorbent substrates.
Figure 3B:
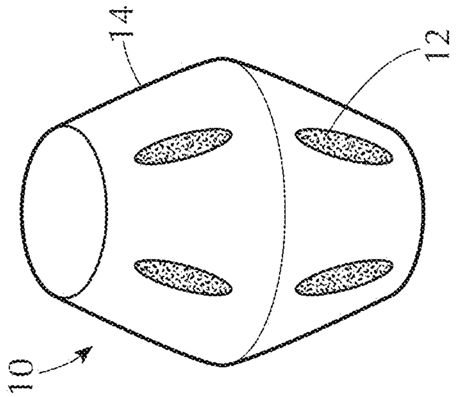
Figure 3C:
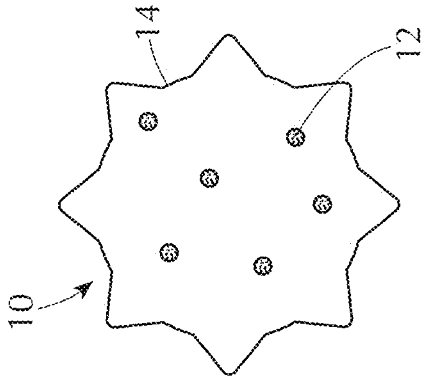

The absorbent substrate 10 can be a variety of shapes, sizes, and material. In some embodiments, the absorbent substrate 10 is wool. In some embodiments, the absorbent substrate 10 is plastic. In some embodiments, the absorbent substrate 10 is rubber. In one embodiment, as shown in FIGS. 1-2, the absorbent substrate 10 is spherical. In another embodiment, as seen in FIG. 3A, the substrate 10 is oblong. In one embodiment, as seen in FIGS. 3B and 3C, the substrate 10 comprises protrusions. The substrate 10 may be cubical, egg shaped, pyramidal, or almost any other shape as long as there are no sharp edges. The substrate 10 may be from about 3 centimeters (cm) to about 40 cm across, where the distance is measured directly across the largest portion of the dryer ball 200. In alternate embodiments the substrate 10 may be from about 4 cm to about 30 cm, or from about 5 cm to about 15 cm, again measured across the largest portion of the substrate 10. In preferred embodiments, substrate 10 comprises a substantially spherical dryer ball 14 having a diameter of about 5 to about 12 cm. In certain particularly preferred embodiments, the diameter of the ball 14 is about 10 cm.

Preferably, dryer ball 14 comprises, consists essentially, or consists of wool or another hydrophilic material. The wool can be sheep's wool or from other types of animals such as, for example Corriedale wool or Cotswold wool, or from wool obtained from other animals, such as for example alpacas, or any combination of wool thereof. Other shapes, sizes, and materials are contemplated.

In certain embodiments, the ball 14 may be formed from wool yarn which has been twisted or wound into a ball and felted by washing and drying the ball several times in succession. Typically, wool dryer balls are hard and dense, and are similar in size to plastic dryer balls (e.g., about the size of a tennis ball or smaller). In some embodiments, the piece of wool material is folded into a substantially spherical wool ball having a circumference in the range of 43 cm to 53 cm. The wool material may be felted. In some embodiments, the spherical wool ball 14 has a diameter of about 4 inches and weighs around 60 to 110 g.

Other exemplary embodiments and materials that can be used for dryer ball 14 are described in U.S. Patent Application Publication No. 20190309464, the contents of which is incorporated herein by reference. Other suitable balls are described in U.S. Pat. Nos. 4,014,105; 4,567,675; and 7,441,345.

Absorbent substrate 10 is provided with a treatment composition 12 disposed on the ball and/or within the ball. FIG. 1B illustrates a cross-sectional view of dryer ball 14 taken along line B-B of FIG. 1A. As illustrated in FIG. 1B, dryer ball 14 has a plurality of areas of treatment composition 12 dispersed within the core of the ball 14. The treatment composition 12 may be substantially uniformly distributed throughout the ball or distributed in another manner. As discussed in further detail below, the treatment composition 12 contains free and encapsulated fragrance.

Figure 4B:
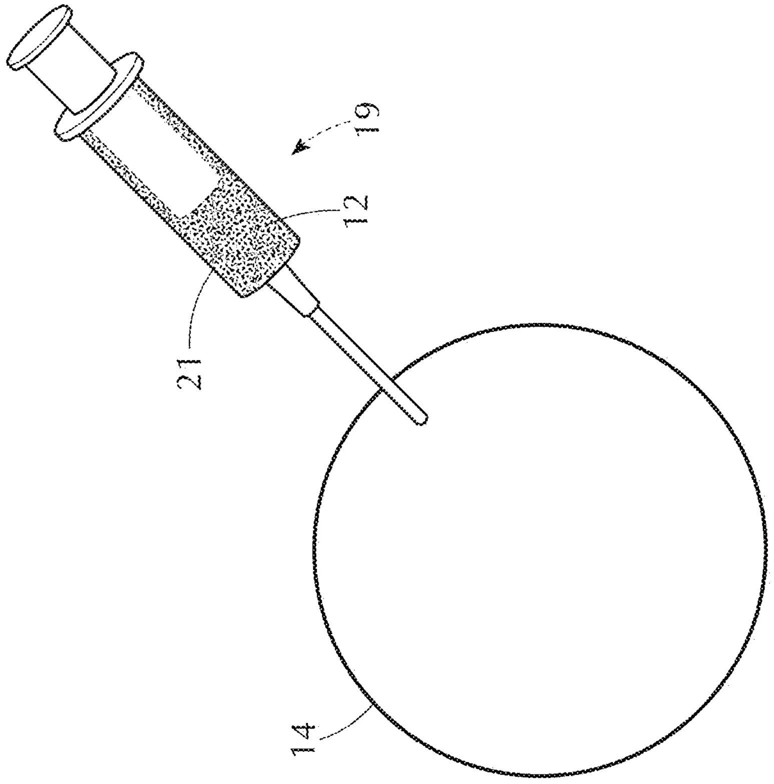
FIG. 4B illustrates a ball and syringe applicator.
Figure 4A:
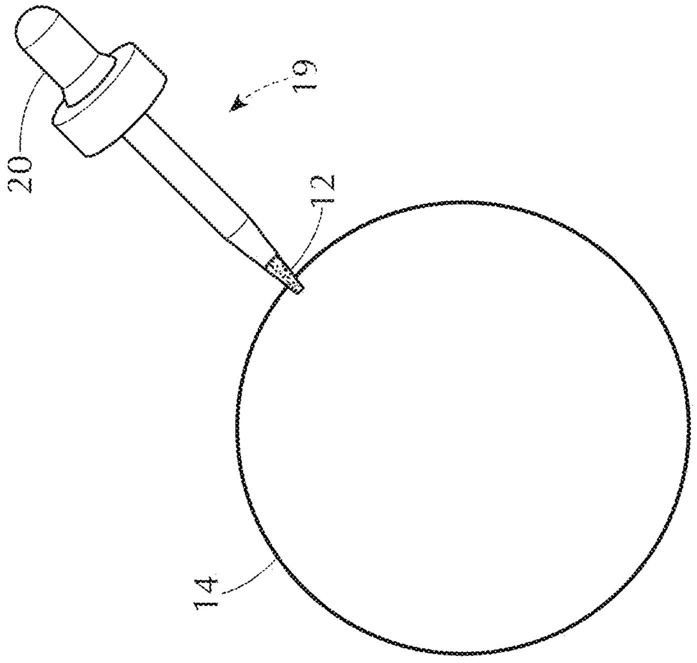
FIG. 4A illustrates a ball and dropper applicator.
Figure 4C:
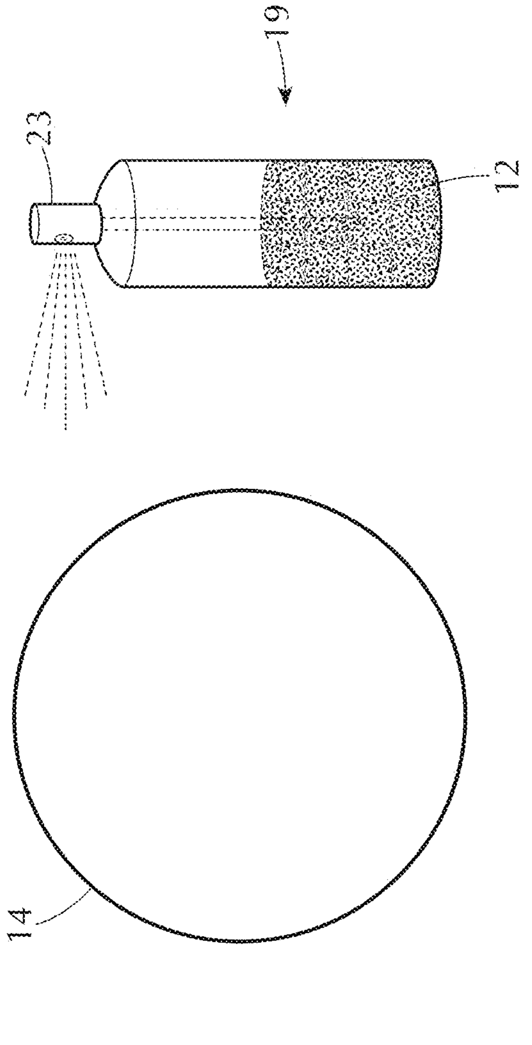
FIG. 4C illustrates a ball and spray applicator.

As illustrated in FIGS. 4A, 4B, and 4C, the treatment can be applied to the surface of the ball with an applicator 19. The applicator can be, e.g., a dropper 20, syringe 21, or sprayer 23 as seen respectively in FIGS. 4A, 4B, and 4C. In FIG. 4C, sprayer 23 tops a container containing the treatment composition 12. The applicator can take a number of other configurations that will be appreciated to those of skill in the art, e.g., roll-on, wipe, brush, comb, etc.

The treatment composition 12 can be applied with applicator 19 in, e.g., an even mist, in separated, discrete areas, or concentrated in one location.

After application, some of the treatment composition 12 may penetrate the interior of the ball 14 via diffusion or other fluid transfer mechanisms. Alternatively, the treatment composition 12 can be directly applied to the interior of the ball

14 using a syringe and needle or other instrument capable of piercing the outer surface of the ball, as illustrated in FIG. 4B.

In some embodiments, the treatment composition 12 may be contained in a wrap that is disposed around an exterior surface of the ball 14. For instance, the laundry ball may include a shell that is water permeable, where the shell forms an enclosure defined by an inside of the laundry ball. An insert is enclosed within the enclosure, where the insert includes a laundering beneficial compound. In some embodiments, the insert may be partially exposed outside the ball but not fall out of the ball. The shell is water permeable, or porous, such that water can flow through, but objects larger than the size of the pores cannot flow through the shell. The shell may be made of a fabric, such as wool, cotton, polyester, silk, or other materials or combinations of materials in various embodiments. The pores are then the spaces that are disposed between and defined by the threads of the fabric. In an alternate embodiment, the shell may be polymeric, and include a polymer such as a polyethylene, polypropylene, polyethylene-polypropylene copolymers, or other polymers. The shell may be a combination of different materials in some embodiments, such as a fabric wrapped over a polymeric base, in whole or in part, or different types of materials woven together or positioned in different locations on the shell. The shell may include rubber, wood, or other materials in various embodiments. The shell forms the outer portion of the substrate 10 in an exemplary embodiment, so the outer dimensions of the shell also essentially determine the outer dimensions of the substrate 10.

Optionally, the dryer ball 14 can include a wrap disposed around an exterior surface of the ball. In some embodiments, the wrap is treated with a treatment agent. The wrap can be a continuous band. The wrap can have a first end and a second end such that the first end and the second end are configured to be releasably attached to the exterior surface of the ball.

Treatment Composition

The treatment composition 12 contemplated herein comprises a free fragrance, and an encapsulated fragrance, that is delivered to the ball via a carrier. The treatment composition can also contain one or more agents that provide laundering benefit. The treatment composition is formulated with an aqueous carrier, emulsifier, and a suspending agent so that it is stable and can be readily disposed on and within ball 14. It is an advantage that the treatment composition is in liquid, rather than powder, form so that it can be easily applied to and retained by hydrophilic ball materials. Optional ingredients may include an odor capturing agent, a softening agent, an anti-static agent, a color protection agent, a UV protector, an anti-pilling agent, a disinfecting/sanitizing agent, a scouring agent, and a mosquito repellant, or any combination thereof.

In certain preferred embodiments, the amount of treatment composition on the ball is about 5.0% to about 10.0% by weight of the ball, more preferably about 6.0% to about 9.0% by weight of the ball. The amount of treatment composition on the ball is calculated as add on based on the weight of the ball measured within 5 minutes after the treatment is applied.

In some embodiments, ball 14 can be pretreated with treatment composition 12 and packaged in moisture resistant packaging shortly after the treatment composition is applied. For instance, the balls can be packaged in mylar bags after the treatment composition is applied. In that case, the amount of treatment composition on the ball is about 5.0% to about 10.0% by weight of the ball, more preferably about 6.0% to about 9.0% by weight of the ball. The amount of treatment on the ball is calculated as add on based on the weight of the ball measured within 5 minutes of removing from the packaging.

In some embodiments, the ball 14 will weigh from about 60 g to about 110 g, more preferably about 65 to about 100 g when stored in ambient laboratory conditions of about 70° F. The weight of the ball 14 will, in certain circumstances, such as where the ball is comprised of wool or another absorbent material, be dependent on the ambient humidity conditions. Accordingly, the amount of treatment composition applied should be determined using starting weight of a ball after it has equilibrated with ambient conditions and shortly before treatment composition is applied.

Free Fragrance

The terms "free fragrance" or "fragrance oil" refers to any type of free, unencapsulated fragrance known to those of skill in the art. The fragrance may be an oil fragrance, an essential oil, botanical extracts, synthetic fragrance materials, or other compounds that provide a desirable odor.

Suitable fragrances are discussed, for example, in U.S. Pat. Nos. 8,119,587B2, 6,869,923 and 7,968,510 which are herein incorporated by reference in their entireties.

In some embodiments, a fragrance oil can be, for example, essential oils such as *angelica* root oil, anise oil, *arnica* blossom oil, basil oil, bay oil, champaca blossom oil, citrus oil, silver fir oil, silver fir cone oil, elemi oil, *eucalyptus* oil, fennel oil, pine needle oil, *galbanum* oil, geranium oil, ginger grass oil, guaiac wood oil, gurjun balsam oil, helichrysum oil, ho oil, ginger oil, iris oil, jasmine oil, cajeput oil, calamus oil, chamomile oil, camphor oil, canaga oil, cardamom oil, *cassia* oil, pine needle oil, copaiba balsam oil, coriander oil, spearmint oil, caraway oil, cumin oil, labdanum oil, lavender oil, lemongrass oil, lime blossom oil, lime oil, mandarin oil, balm oil, mint oil, musk seed oil, muscatel oil, myrrh oil, clove oil, neroli oil, niaouli oil, olibanum oil, orange blossom oil, orange oil, *origanum* oil, palmarosa oil, patchouli oil, peru balsam oil, petitgrain oil, pepper oil, peppermint oil, pimento oil, pine oil, rose oil, rosemary oil, sage oil, sandalwood oil, celery oil, spike oil, star anise oil, turpentine oil, *thuja* oil, thyme oil, *verbena* oil, vetiver oil, juniper berry oil, wormwood oil, wintergreen oil, ylang-ylang oil, hyssop oil, cinnamon oil, cinnamon leaf oil, citronella oil, lemon oil and cypress oil and ambrettolide, ambroxan, alpha-amylcinnamaldehyde, anethol, anisaldehyde, anise alcohol, anisol, anthranilic acid methyl ester, acetophenone, benzyl acetone, benzaldehyde, benzoic acid ethyl ester, benzophenone, benzyl alcohol, benzyl acetate, benzyl benzoate, benzyl formate, benzyl valerianate, borneol, bornyl acetate, boisambrene forte, alpha-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptine carboxylic acid methyl ester, heptaldehyde, hydroquinone dimethyl ether, hydroxycinnamaldehyde, hydroxycinnamyl alcohol, indol, irone, isoeugenol, isoeugenol methyl ether, isosafrole, jasmone, camphor, carvacrol, carvone, p-cresol methyl ether, cumarin, p-methoxyacetophenone, methyl n-amyl ketone, methyl anthranilic acid methyl ester, p-methyl acetophenone, methyl chavicol, p-methyl quinoline, methyl beta-naphthyl ketone, methyl n-nonyl acetaldehyde, methyl n-nonyl ketone, muscone, beta-naphthol ethyl ether, beta-naphthol methyl ether, nerol, n-nonyl aldehyde, nonyl alcohol, n-octyl aldehyde, p-oxy-acetophenone, pentadecanolide, beta-phenyl ethyl alcohol, phenyl acetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, gamma-undelactone, vanillin, veratrum aldehyde, cinnmaldehyde, cinnamyl alcohol, cinnamic acid, cinnamic acid ethyl ester, cinnamic acid benzyl ester, diphenyl oxide, limonene, linalool, linalyl acetate and propionate, melusat, menthol, menthone, methyl n-heptenone pinene, phenyl acetaldehyde, terpinyl acetate, citral, citronellal, and mixtures thereof.

In some embodiments, the fragrance can be an ester, an ether, an aldehyde, a ketone, an alcohol, a hydrocarbon, an essential oil, and a combination thereof.

In some embodiments, the fragrance can be, for example, adoxal (2,6,10-trimethyl-9-undecenal), anisaldehyde (4-methoxybenzaldehyde), cymal (3-(4-isopropyl-phenyl)-2-methylpropanal), ethylvanillin, florhydral (3-(3-isopropylphenyl)butanal), helional (3-(3,4-methylenedioxyphenyl)-2-methylpropanal), heliotropin, hydroxycitronellal, lauraldehyde, lyral (3- and 4-(4-hydroxy-4-methylpentyl)-3-cyclohexene-1-carboxaldehyde), methyl nonyl acetaldehyde, lilial (3-(4-tert-butylphenyl)-2-methylpropanal), phenyl acetaldehyde, undecylenaldehyde, vanillin, 2,6,10-trimethyl-9-undecenal, 3-dodecen-1-al, alpha-n-amylcinnamaldehyde, melonal (2,6-dimethyl-5-heptenal), 2,4-dimethyl-3-cyclohexene-1-carboxaldehyde (triplal), 4-methoxybenzaldehyde, benzaldehyde, 3-(4-tert-butylphenyl)propanal, 2-methyl-3-(paramethoxyphenyl) propanal, 2-methyl-4-(2,6,6-timethyl-2(1)-cyclohexen-1-yl)butanal, 3-phenyl-2-propenal, cis-/trans-3,7-dimethyl-2,6-octadien-1-al, 3,7-dimethyl-6-octen-1-al, [(3,7-dimethyl-6-octenyl) oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexene-1-carboxaldehyde, 2-methyl-3-(isopropylphenyl)propanal, 1-decanal, 2,6-dimethyl-5-heptenal, 4-(tricyclo[5.2.1.0(2,6)]decylidene-8)butanal, octahydro-4,7-methano-Hindenecarboxaldehyde, 3-ethoxy-4-hydroxybenzaldehyde, para-ethyl-alpha,alphadimethylhydrocinnamaldehyde, alpha-methyl-3,4-(methylenedioxy)hydrocinnamaldehyde, 3,4-ethylenedioxybenzaldehyde, alphan-hexylcinnamaldehyde, m-cymene-7-carboxaldehyde, alpha-methyl phenylacetaldehyde, 7-hydroxy-3,7-dimethyloctanal, undecanal, 2,4,6-trimethyl-3-cyclohexene-1-carboxaldehyde, 4-(3)(4-methyl-3-pentenyl)-3-cyclohexenecarboxaldehyde, 1-dodecanal, 2,4-dimethylcyclohexene-3-carboxaldehyde, 4-(4-hydroxy-4-methylpentyl)-3-cylohexene-1-carboxaldehyde, 7-methoxy-3,7-dimethyloctan-1-al, 2-methylundecanal, 2-methyldecanal, 1-nonanal, 1-octanal, 2,6,10-trimethyl-5,9-undecadienal, 2-methyl-3-(4-tertbutyl) propanal, dihydrocinnamaldehyde, 1-methyl-4-(4-methyl-3-pentenyl)-3-cyclohexene-1-carboxaldehyde, 5- or 6-methoxyhexahydro-4,7-methanoindane-1- or -2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexenecarboxaldehyde, 7-hydroxy-3J-dimethyloctanal, trans-4-decenal, 2,6-nonadienal, para-tolylacetaldehyde, 4-methylphenylacetaldehyde, 2-methyl-4-(2,6,6-trimethyl-1-cyclohexen-1-yl)-2-butenal, ortho-methoxycinnamaldehyde, 3,5,6-trimethyl-3-cyclohexene-carboxaldehyde, 3J-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanoindane-1-carboxaldehyde, 2-methyloctanal, alpha-methyl-4-(1-methylethyl)benzene acetaldehyde, 6,6-dimethyl-2-norpinene-2-propionaldehyde, paramethylphenoxyacetaldehyde, 2-methyl-3-phenyl-2-propen-1-al, 3,5,5-trimethylhexanal, hexahydro-8,8-dimethyl-2-naphthaldehyde, 3-propyl-bicyclo-[2.2.1]-hept-5-ene-2-carbaldehyde, 9-decenal, 3-methyl-5-phenyl-1-pentanal, methyl nonyl acetaldehyde, hexanal and trans-2-hexenal.

In some embodiments, the fragrance can be, for example, methyl betanaphthyl ketone, musk indanone (1,2,3,5,6,7-hexahydro-1,1,2,3,3-pentamethyl-4H-inden-4-one), tonalide (6-acetyl-1,1,2,4,4,7-hexamethyltetralin), alphadamascone, beta-damascone, delta-damascone, iso-damascone, damascenone, methyl dihydrojasmonate, menthone, carvone, camphor, koavone (3,4,5,6,6-pentamethylhept-3-en-2-one), fenchone, alpha-ionone, beta-ionone, gammamethyl ionone, fleuramone (2-heptylcyclopentanone), dihydrojasmone, cisjasmone, Iso E Super (1-(1,2,3,4,5,6J,8-octahydro-2,3,8,8-tetramethyl-2-naphthalenyl)ethan-1-one (and isomers)), methyl cedrenyl ketone, acetophenone, methyl acetophenone, para-methoxyacetophenone, methyl beta-naphtyl ketone, benzyl acetone, benzophenone, para-hydroxyphenylbutanone, celery ketone (3-methyl-5-propyl-2-cyclohexenone), 6-isopropyldecahydro-2-naphtone, dimethyl octenone, frescomenthe (2-butan-2-ylcyclohexan-1-one), 4-(1-ethoxyvinyl)-3,3,5,5-tetramethylcyclohexanone, methyl heptenone, 2-(2-(4-methyl-3-cyclohexen-1-yl)propyl)cyclopentanone, 1-(p-menthen-6(2)yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4(5H)indanone, 4-damascol, dulcinyl(4-(1,3-benzodioxol-5-yl)butan-2-one), Hexalon (1-(2,6,6-trimethyl-2-cyclohexen-1-yl)-1,6-heptadien-3-one), isocyclemone E (2-acetonaphthone-1,2,3,4,5,6,7,8-octahydro-2,3,8,8-tetramethyl), methyl nonyl ketone, methyl cyclocitrone, methyl lavender ketone, orivone (4-tert-amylcyclohexanone), 4-tert-butylcyclohexanone, delphone (2-pentyl cyclopentanone), muscone (CAS 541-91-3), neobutenone (1-(5,5-dimethyl-1-cyclohexenyl)pent-4-en-1-one), plicatone (CAS 41724-19-0), veloutone (2,2,5-trimethyl-5-pentylcyclopentan-1-one), 2,4,4,7-tetramethyloct-6-en-3-one and tetrameran (6,10-dimethylundecen-2-one).

In some embodiments, the fragrance can be, for example, 10-undecen-1-ol, 2,6-dimethylheptan-2-ol, 2-methylbutanol, 2-methylpentanol, 2-henoxyethanol, 2-phenylpropanol, 2-tert-butylcyclohexanol, 3,5,5-trimethylcyclohexanol, 3-hexanol, 3-methyl-5-phenylpentanol, 3-octanol, 3-phenylpropanol, 4-heptenol, 4-isopropylcyclohexanol, 4-tert-butylcyclohexanol, 6,8-dimethyl-2-nonanol, 6-nonen-1-ol, 9-decen-1-ol, α-methylbenzyl alcohol, α-terpineol, amyl salicylate, benzyl alcohol, benzyl salicylate, β-terpineol, butyl salicylate, citronellol, cyclohexyl salicylate, decanol, dihydromyrcenol, dimethyl benzyl carbinol, dimethyl heptanol, dimethyl octanol, ethyl salicylate, ethyl vanillin, eugenol, farnesol, geraniol, heptanol, hexyl salicylate, isoborneol, isoeugenol, isopulegol, linalool, menthol, myrtenol, n-hexanol, nerol, nonanol, octanol, p-menthan-7-ol, phenylethyl alcohol, phenol, phenyl salicylat, tetrahydrogeraniol, tetrahydrolinalool, thymol, trans-2-cis-6-nonadicnol, trans-2-nonen-1-ol, trans-2-octenol, undecanol, vanillin, champiniol, hexenol and cinnamyl alcohol.

In some embodiments, the fragrance can be, for example, for example, benzyl acetate, phenoxyethyl isobutyrate, p-tert-butylcyclohexyl acetate, linalyl acetate, dimethyl benzyl carbinyl acetate (DMBCA), phenyl ethyl acetate, benzyl acetate, ethylmethylphenyl glycinate, allyl cyclohexyl propionate, styralyl propionate, benzyl salicylate, cyclohexyl salicylate, floramat, melusat and jasmacyclat.

In one embodiment, the fragrance can be, for example, for example, benzyl ethyl ether and ambroxan. The hydrocarbons include mainly terpenes, such as limonene and pinene.

In some embodiments, the fragrance is, for example, a musky scent, a pungent scent, a camphoraceous scent, an ethereal scent, a floral scent, a fruity scent, a peppermint scent, an aromatic scent, a gourmand scent, or any combination thereof.

In some embodiments, the fragrance can be mixtures of various fragrances, which can be referred to as a perfume or perfume oil. Perfume oils of this kind may also contain natural fragrance mixtures, as are obtainable from plant sources.

In some embodiments, the fragrance can be a fragrance precursor. “Fragrance precursor” refers to compounds which only release the actual fragrance following chemical conversion/separation, for example, when exposed to light or other environmental conditions, such as pH, temperature, etc. Treatment agents of this kind are often referred to as pro-fragrances.

Other fragrances known in the art, or any fragrance commercially available from a fragrance supplier (e.g., Firmenich, Givaudan, IFF, Symrise, Agilex etc.), or any combination of such fragrances, may also suitably be used in the treatment compositions and methods disclosed herein.

In some embodiments, the free fragrance is present in the treatment composition from about 0.1 wt. % to about 20 wt. %, or from about 0.5 wt. % to about 20 wt. %, or from about 0.5 wt. % to about 15 wt. %, or from about 1 wt. % to about 5 wt. %, based on the volume of the treatment composition.

In some embodiments, the free fragrance is, for example, present in the treatment composition in an amount of about 0.5 wt. %, about 1.0 wt. %, about 1.5 wt. %, about 2.0 wt. %, about 3.0 wt. %, about 4.0 wt. %, or about 5.0 wt. %. In some embodiments, the free fragrance is, for example, present in an amount from about 0.1 wt. % to about 5 wt. %, from about 0.5 wt. % to about 4.5 wt. %, about 0.5 wt. % to about 4 wt. %, from about 1.0 wt. % to about 4 wt. %, or from about 1.5 wt. % to about 4 wt. %.

In some embodiments, the free fragrance is present on or within the ball 14 in an amount from about 0.025 g to about 1.0 g, more preferably from about 0.05 g to about 0.8 g, most preferably from about 0.1 g to about 0.4 g, or from about 0.1 g to about 0.2 g, based on the total weight of the ball.

In certain embodiments, the amount of free fragrance on the ball 14 is about 0.02% to about 2.0% by weight of the ball, more preferably about 0.045% to about 1.5%, most preferably or about 0.1% to about 0.75%, or about 0.1% to about 0.5% by weight of the ball. The weight percent on the ball is calculated as add on based on the weight of the ball before any treatment composition is applied.

In one embodiment, the fragrance has a melting point that is in the range of from about 35° C. to about 75° C.

Encapsulated Fragrance(s)

The treatment composition contains one or more encapsulated fragrances. The term encapsulated fragrance refers to fragrance that is encapsulated for example, in a microcapsule or a nanocapsule. The microcapsules and nanocapsules can be water-soluble or water insoluble.

Examples of encapsulated fragrances are described in, for example, U.S. Pat. Nos. 6,024,943, 6,056,949, 6,194,375, 6,458,754 and 8,426,353, and US 2011/0224127 A1 and US 2017/0121648, each of which is incorporated by reference in its entirety.

Encapsulation of fragrances prevents the fragrance from being released prematurely. The encapsulation may be ruptured at some time period after application to the garment, so fresh fragrance may be provided significantly after a garment is removed from a washing machine. The encapsulation may be ruptured by a wide variety of activities, such as physical contact from movement, melting, degradation from sunlight, degradation from oxidation, or other reasons. The encapsulation may be formed by aminoplast or cross-linked gelatin, polymeric materials, or other materials.

In some embodiments, the encapsulated fragrance is present in an amount from about 0.1 wt. % to about 10 wt. %, from about 0.1 wt. % to about 8 wt. %, from about 0.1 wt. % to about 6 wt. %, from about 0.1 wt. % to about 4 wt. %, or from about 0.1 wt. % to about 3 wt. % of the treatment composition. In some embodiments, the encapsulated fragrance is present in an amount from about 0.75 wt. % to about 7.5 wt. %, 1 wt. % to about 5 wt. %, from about 1 wt. % to about 4 wt. %, or from about 1 wt. % to about 3 wt. %. In some embodiments, the encapsulated fragrance is present in an amount from about 1.0 wt. % to about 2.5 wt. or from about 2.0 wt. % to about 2.5 wt. % of the treatment composition.

In some embodiments, the encapsulated fragrance is present in/on the ball 14 in an amount from about 5 mg to about 1.5 g, more preferably from about 15 mg to about 1.2 g, or from about 30 mg to about 0.6 g, based on the total weight of the ball.

In certain preferred embodiments, the amount of encapsulated fragrance in/on the ball 14 is about 0.005% to about 2.5% by weight of the ball, more preferably about 0.015% to about 2.0% by weight of the ball, most preferably from about 0.05% to about 1.0% of the ball. The weight percent on the ball is calculated as add on based on the weight of the ball before any treatment composition is applied.

Emulsifier

In some embodiments, the fragrance and/or encapsulated fragrance is combined with an emulsifier.

Suitable emulsifiers can include nonionic surfactants. Suitable nonionic surfactants include sorbitan derivatives, such as PEG derivates. One preferred emulsifier is PEG-80 sorbitan laurate.

In some embodiments, the emulsifier is present in the treatment composition from about 0.1 wt. % to about 10 wt. %, from about 0.1 wt. % to about 8 wt. %, from about 0.1 wt. % to about 6 wt. %, from about 0.1 wt. % to about 4 wt. %, and from about 0.1 wt. % to about 3 wt. % of the treatment composition. In some embodiments, the emulsifier is present in an amount from about 1 wt. % to about 5 wt. %, from about 1 wt. % to about 4 wt. %, and from about 1 wt. % to about 3 wt. %. In some embodiments, the emulsifier is present in an amount from about 2.0 wt. % to about 3.5 wt. and from about 1.5 wt. % to about 2.5 wt. % of the treatment composition.

In some embodiments, the emulsifier is present on/in the ball 14 in an amount from about 0.05 g to about 1.0 g, or from about 0.05 g to about 0.5 g, or from about 0.06 g to about 0.30 g, or from about 0.07 to about 0.025 g based on the total weight of the ball.

In certain preferred embodiments, the amount of emulsifier in/on the ball 14 is about 0.05% to about 0.10% by weight of the ball, more preferably about 0.05% to about 0.5% by weight of the ball, or from about 0.06 wt. % to about 0.30 wt. %, or from about 0.07 to about 0.025 wt. % of the ball. Here, the weight percent on the ball is calculated as add on based on the weight of the ball before any treatment composition is applied.

Colorant(s)

In some embodiments, the treatment composition further comprises one or more colorants. In some embodiments, the colorant(s) is, for example, polymers, dyes, water-soluble dyes, water-soluble polymeric colorants, pigments, a biological an ink, paint, or any combination thereof.

In some embodiments, the colorants are, for example, colorants that are well-known in the art or commercially available from dye or chemical manufacturers.

In some embodiments, the colorant(s) is not limited, and can be, for example, red, orange, yellow, blue, indigo, violet, or any combination thereof. In some embodiments, the colorant(s) can be, for example, VIOLET LS, ROYAL MC, BLUE HP, BLUE MC, AQUAMARINE, GREEN HMC, BRIGHT YELLOW, YELLOW LP, YELLOW BL, BRILLIANT ORANGE, CRIMSON, RED MX, PINK AL, RED BL, RED ST, or any combination thereof.

In some embodiments, the colorant is, for example, present in the treatment composition in an amount from about 0.0001 wt. % to about 0.01 wt. %, from about 0.0002 wt. % to about 0.009 wt. %, from about 0.0003 wt. % to about 0.008 wt. %, from about 0.0004 wt. % to about 0.007 wt. %, from about 0.0005 wt. % to about 0.006 wt. %, from about 0.0006 wt. % to about 0.005 wt. %, from about 0.0007 wt. % to about 0.004 wt. %, from about 0.0008 wt. % to about 0.003 wt. %, from about 0.0009 wt. % to about 0.002 wt. %, or from about 0.001 wt. % to about 0.0015 wt. %. In some embodiments, the colorant is, for example, present in an amount ranging from about 0.001 wt. % to about 0.0015 wt. % of the treatment composition.

In some embodiments, the colorant is, for example, present in the treatment composition in an amount of about 0.0001 wt. %, about 0.0002 wt. %, about 0.0003 wt. %, about 0.0004 wt. %, about 0.0005 wt. %, about 0.0006 wt. %, about 0.0007 wt. %, about 0.0008 wt. %, about 0.0009 wt. %, about 0.001 wt. %, about 0.0015 wt. %, about 0.00125 wt. %, about 0.002 wt. %, about 0.003 wt. %, about 0.004 wt. %, about 0.005 wt. %, about 0.006 wt. %, about 0.007 wt. %, about 0.008 wt. %, about 0.009 wt. %, or about 0.010 wt. %, In some embodiments, the colorant is, for example, present in an amount of about 0.001 wt. % of the treatment composition.

In some embodiments, the colorant is present, for example, in the suspension medium.

Neutralizing Agent

In some embodiments, the treatment composition further comprises one or more neutralizing agents. In some embodiments, the neutralizing agent is, for example, triethanolamine, sodium hydroxide, potassium hydroxide, monoethanolamine or other neutralizing agents known in the art. In some embodiments, the neutralizing agent is, for example, triethanolamine.

In some embodiments the neutralizing agent is, for example, present in the treatment composition an amount from about 0.001 wt. % to about 1 wt. %, from about 0.002 wt. % to about 0.9 wt. %, from about 0.003 wt. % to about 0.8 wt. %, from about 0.004 wt. % to about 0.7 wt. %, from about 0.005 wt. % to about 0.6 wt. %, from about 0.006 wt. % to about 0.5 wt. %, from about 0.007 wt. % to about 0.4 wt. %, from about 0.008 wt. % to about 0.3 wt. %, from about 0.009 wt. % to about 0.2 wt. %, or from about 0.01 wt. % to about 0.15 wt. %. In some embodiments, the neutralizing agent is present in an amount from about 0.004 wt. % to about 0.7 wt. %. In some embodiments, the neutralizing agent is present in an amount from about 0.003 wt. % to about 0.8 wt. %. In some embodiments, the neutralizing agent is present in an amount from about 0.01 wt. % to about 0.15 wt. %. In some embodiments, the neutralizing agent is present in an amount from about 0.01 wt. % to about 1 wt. %, from about 0.01 wt. % to about 0.8 wt. %, and from about 0.01 wt. % to about 0.6 wt. %. In some embodiments, the neutralizing agent is present in an amount from about 0.1 wt. % to about 1 wt. %, from about 0.1 wt. % to about 0.8 wt. %, from about 0.1 wt. % to about 0.6 wt. %, and from about 0.1 wt. % to about 0.4 wt. % of the treatment composition.

In some embodiments, the neutralizing agent is, for example, present in the treatment composition an amount of about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.10 wt. %, about 0.11 wt. %, about 0.12 wt. %, about 0.13 wt. %, about 0.14 wt. %, about 0.16 wt. %, about 0.17 wt. %, about 0.18 wt. %, about 0.19 wt. %, about 0.2 wt. %, about 0.3 wt. %, about 0.4 wt. %, about 0.5 wt. %, about 0.6 wt. %, about 0.7 wt. %, or about 0.8 wt. %. In some embodiments, the neutralizing agent is present in an amount of about 0.08 wt. %. In some embodiments, the neutralizing agent is present in an amount of about 0.27 wt. %. In some embodiments, the neutralizing agent is present in an amount of about 0.75 wt. % of the treatment composition.

Rheology Modifier/Suspending Polymer

The free fragrance and encapsulated fragrance will often require the benefit of a rheology modifier/suspending agent in order to produce stable suspensions that can be readily sprayed, dropped, or injected onto the ball 14.

In some embodiments, a suspending polymer is selected from the group consisting of a water-soluble polymer, a water-dispersible polymer, and any combination thereof. In some embodiments, the suspending polymer is selected from the group consisting of a hydrophobically-modified alkali swellable emulsion polymer (HASE), an alkali swellable emulsion polymer (ASE), a cationic polymer, an anionic polysaccharide polymer, and any combination thereof.

In some embodiments, the suspending polymer is either a hydrophobically-modified alkali swellable emulsion polymer (HASE), or an alkali soluble emulsion polymer (ASE).

In some embodiments, the hydrophobically-modified alkali swellable emulsion polymer (HASE) is, for example, CARBOPOL EZ-4, CARBOPOL EDT 2623, ACULYN 88, ACUSOL 801S, ACUSOL MILLENNIUM, RHEOVIS AT-120, or any combination thereof.

In some embodiments, the alkali swellable emulsion polymer (ASE) is, for example, a cross-linked acrylic, polymer dispersion, a cross-linked polyacrylate powder, an alkali-swellable anionic acrylic polymer emulsion, a cross-linked acrylic acid homopolymer, or any combination thereof. In some embodiments, the alkali swellable emulsion polymer (ASE) is a cross-linked acrylic polymer dispersion.

In some embodiments, the cationic polymer is selected from the group consisting of a polyacrylate-1 crosspolymer, a cationic acrylic polymer, diethylesterdimethylammonium chloride and any combination thereof. In some embodiments, the anionic polysaccharide polymer is selected from the group consisting of guar gum, diutan gum, xanthan gum, and any combination thereof.

In some embodiments, the suspending polymer is present in the treatment composition in an amount from about 0.01 wt. % to about 3.0 wt. %, from about 0.01 wt. % to about 2.0 wt. %, from about 0.01 wt. % to about 1.75 wt. %, and from about 0.01 wt. % to about 1.0 wt. %. In some embodiments, the suspending polymer is present in the treatment composition in an amount from about 0.05 wt. % to about 1.5 wt. %, from about 0.05 wt. % to about 1.0 wt. %, and from about 0.05 wt. % to about 1.0 wt. %. In some embodiments, the suspending polymer is present in the treatment composition in an amount from about 0.1 wt. % to about 3.0 wt./o, from about 0.1 wt. % to about 2.5 wt. %, from about 0.1 wt. % to about 2.0 wt. %, from about 0.1 wt. % to about 1.75 wt. %, from about 0.2 wt. % to about 1.5 wt. %, from about 0.2 wt.

% to about 1.25 wt. %. Here, weight percentages are all based on the total weight of the aqueous treatment composition.

In some embodiments, the suspending agent is present on/in the ball 14 in an amount from about 0.01 g to about 0.10 g, or from about 0.02 g to about 0.06 g, or from about 0.03 g to about 0.05 g, based on the total weight of the ball.

In certain preferred embodiments, the amount of emulsifier in/on the ball 14 is about 0.01% to about 0.10% by weight of the ball, more preferably about 0.02% to about 0.06% by weight of the ball, or from about 0.03 wt. % to about 0.05 wt. % of the ball. Here, the weight percent on the ball is calculated as add on based on the weight of the ball before any treatment composition is applied.

Salt

In some embodiments, salt is used for the purpose of stabilizing the suspending base in the presence of the fragrance encapsulation composition, as certain fragrance cores require salt for stabilization. In some embodiments the salt is selected from the group consisting of a water-soluble inorganic alkali metal salt, a water-soluble organic alkali metal salt, a water-soluble inorganic alkaline earth metal salt, a water-soluble organic alkaline earth metal salt, sodium chloride, sodium bromide, sodium iodide, sodium sulfate, sodium bisulfate, sodium phosphate, sodium carbonate, sodium acetate, sodium citrate, sodium lactate, potassium chloride, potassium bromide, potassium iodide, potassium sulfate, potassium bisulfate, potassium phosphate, potassium carbonate, potassium acetate, potassium citrate, potassium lactate, magnesium chloride, magnesium bromide, magnesium iodide, magnesium sulfate, magnesium phosphate, magnesium carbonate, magnesium acetate, magnesium citrate, magnesium lactate, calcium chloride, calcium bromide, calcium iodide, calcium sulfate, calcium phosphate, calcium carbonate, calcium acetate, calcium citrate, calcium lactate, and any combination thereof. In some embodiments, the salt is sodium chloride. In some embodiments, the salt is calcium chloride.

In some embodiments, the salt component is, for example, present in an the treatment composition amount from about 0.001 wt. % to about 1 wt. %, from about 0.002 wt. % to about 0.9 wt. %, from about 0.003 wt. % to about 0.8 wt. %, from about 0.004 wt. % to about 0.7 wt. %, from about 0.005 wt. % to about 0.6 wt. %, from about 0.006 wt. % to about 0.5 wt. %, from about 0.007 wt. % to about 0.4 wt. %, from about 0.008 wt. % to about 0.3 wt. %, from about 0.009 wt. % to about 0.2 wt. %, or from about 0.01 wt. % to about 0.15 wt. %. In some embodiments, the salt is present in an amount from about 0.004 wt. % to about 0.7 wt. %. In some embodiments, the salt is present in an amount from about 0.003 wt. % to about 0.8 wt. %. In some embodiments, the salt is present in an amount from about 0.01 wt. % to about 0.15 wt. %. In some embodiments, the salt is present in an amount of about 0.04 wt. %.

Other Ingredients

Adjunct ingredients may be included in the treatment composition or applied directly on the ball 14 to impart other beneficial properties. Adjunct ingredients can include, odor capturing agent, softening agent, anti-static agent, color protection agent, UV protectors, anti-pilling agents, disinfecting/sanitizing agents, scouring agent, and mosquito repellants.

Odor Capturing Agent

In some embodiments, the treatment agent can include an odor capturing agent. Suitable odor capturing agents include cyclodextrins and zinc ricinoleate.

In some embodiments, the odor capturing agent is present in the treatment composition from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment composition.

In some embodiments, the odor capturing agent is present on/in the ball in an amount from about 0.1 g to about 8.0 g, or from about 0.5 g to about 7.0 g, or from about 1 g to about 6 g, or from about 2 g to about 5 g, or from about 3 g to about 5 g, or from about 4 g to about 5 g, based on the total weight of the ball.

Fiber Protection

In some embodiments, the treatment agent can include a fiber protection agent. Suitable fiber protection agents include cellulosic polymers.

In some embodiments, the fiber protection agent is present in the treatment composition from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment composition In some embodiments, the fiber protection agent is present on/in the ball in an amount from about 0.1 g to about 8.0 g, or from about 0.5 g to about 7.0 g, or from about 1 g to about 6 g, or from about 2 g to about 5 g, or from about 3 g to about 5 g, or from about 4 g to about 5 g, based on the total weight of the ball.

Softening Agent

In some embodiments, the treatment agent for fabric treatment can include a softening agent.

In some embodiments, the softening agent can be a quaternary ammonium compound. In some embodiments, suitable quaternary ammonium compounds can be alkylated quaternary ammonium compounds, ring or cyclic quaternary ammonium compounds, aromatic quaternary ammonium compounds, diquatemary ammonium compounds, alkoxylated quaternary ammonium compounds, amidoamine quaternary ammonium compounds, ester quaternary ammonium compounds monoester quats, diester quats ("DEQ"), triester quats and combinations thereof.

In some embodiments, suitable quaternary ammonium compounds can be: esters of bis-(2-hydroxypropyl)-dimethylammonium methyl sulfate, isomers of esters of bis-(2-hydroxypropyl)-dimethylammonium methylsulfate and fatty acid, N,N-bis-(stearoyl-2-hydroxypropyl)-N,N-dimethylammonium methyl sulfate, esters of bis-(2-hydroxypropyl)-dimethylammonium methylsulfate, isomers of esters of bis-(2-hydroxypropyl)-dimethylammonium methyl sulfate, esters of N,Nbis(hydroxyethyl)-N,N-dimethyl ammonium chloride, N,N-bis(stearoyl-oxyethyl)-N,N-dimethyl ammonium chloride, esters of N,N,N-tri(2-hydroxyethyl)-Nmethyl ammonium methyl sulfate, N,N-bis-(palmitoyl-2-hydroxypropyl)-N, Ndimethylammoniumethylsulfate, N,N-bis-(stearoyl-2-hydroxypropyl)-N,Ndimethylammonium chloride, 1,2-di-(stearoyl-oxy)-3-trimethylammoniumpropane chloride, dicanoladimethylammonium chloride, di(hard)tallowdimethylamrnonium chloride, dicanoladimethylammonium methyl sulfate, 1-methyl-1-stearoylamidoethyl-2-stearoylimidazolinium methyl sulfate, imidazoline quat: 1-tallowylamidoethyl-2-tallowylimidazoline, dipalmitoylmethyl hydroxyethylammonium methyl sulfate, dipalmylmethyl hydroxyethylammoinum methyl sulfate, 1,2-di(acyloxy)-3-trimethylamrnoniopropane chloride, and mixtures thereof.

In some embodiments, quaternary ammonium compounds can be ammonium compounds having an alkyl group containing between 6 and 24 carbon atoms. Additional suitable alkylated quaternary alkylated quaternary ammonium compounds include but are not limited to: monoalkyl trimethyl quaternary ammonium compounds, monomethyl trialkyl quaternary ammonium compounds, and dialkyl dimethyl quaternary ammonium compounds. The alkyl group can be a C8-C22 group or a C8-C18 group or a C12-C22 group that is aliphatic and saturated or unsaturated or straight or branched, an alkyl group, a benzyl group, an alkyl ether propyl group, hydrogenated-tallow group, coco group, stearyl group, palmityl group, and soya group.

In some embodiments, cyclic quaternary ammonium compounds can be: imidazolinium quaternary ammonium compounds include methyl-1hydr. tallow amido ethyl-2-hydr. tallow imidazolinium-methyl sulfate, methyl-1-tallow amido ethyl-2-tallow imidazolinium-methyl sulfate, methyl-1-oleyl amido ethyl-2-oleyl imidazolinium-methyl sulfate, and 1-ethylene bis (2-tallow, 1-methyl, imidazolinium-methyl sulfate). Suitable aromatic quaternary ammonium compounds include those compounds that have at least one benzene ring in the structure, included but not limited to: aromatic quaternary ammonium compounds include dimethyl alkyl benzyl quaternary ammonium compounds, monomethyl dialkyl benzyl quaternary ammonium compounds, trimethyl benzyl quaternary ammonium compounds, and trialkyl benzyl quaternary ammonium compounds. The alkyl group can contain between about 6 and about 24 carbon atoms, and can contain between about 10 and about 18 carbon atoms, and can be a stearyl group or a hydrogenated tallow group. In some embodiments, the aromatic quaternary ammonium compounds can include multiple benzyl groups.

In some embodiments, the quaternary ammonium compound can be diquaternary ammonium compounds, e.g., having at least two quaternary ammonium groups. A suitable compound is N-tallow pentamethyl propane diammonium dichloride.

In some embodiments, the quaternary ammonium compound can be amidoamine quaternary ammonium compounds. Suitable compounds are diamidoamine quaternary ammonium compounds. In an embodiment, the amidoamine quaternary ammonium compound can include but is not limited to: methyl-bis(tallow amidoethyl)-2-hydroxyethyl ammonium methyl sulfate, methyl bis(oleylamidoethyl)-2-hydroxyethyl ammonium methyl sulfate, and methyl bis (hydr.tallowamidoethyl)-2-hydroxyethyl ammonium methyl sulfate.

In some embodiments, to maintain odor stability of a liquid agent while improving processability of the quaternary ammonium compound, the iodine value (IV) of the parent fatty acyl compound or acid from which the alkyl or, alkenyl chains are derived is from 0 to 60, preferably from 12 to 58, more preferably from 18 to 56.

Suitable commercially available salts are dialkylenedimethylammonium salts, such as dioleyldimethylammonium chloride and dihardtallow dimethylammonium chloride.

Quaternary ammonium compound agents and general methods of making them are disclosed in U.S. Pat. No. 4,137,180, which is herein incorporated by reference in its entirety.

In some embodiments, the quaternary ammonium compound is present in the treatment agent from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment agent.

In some embodiments, the quaternary ammonium compound is present on/in the ball in an amount from about 0.5 g to about 5.0 g, or from about 1.0 g to about 5.0 g, or from about 1 g to about 4.5 g, or from about 2 g to about 4.5 g, or from about 3 g to about 5 g, or from about 3 g to about 4.5 g, based on the total weight of the ball.

In one embodiment, the softening agent can be a silicone.

In some embodiments, the silicone can be a non-functionalized silicone such as polydimethylsiloxane (PDMS) or alkyl or alkoxy functional silicone, amino functionalized silicones, and/or anionic silicones, such as carboxyl functionalized silicone. In one embodiment, the silicone can include functionalized silicone or a silicone copolymer with one or more different types of functional groups, including amino, phenyl, polyether, acrylate, siliconhydride, carboxylic acid, and quaternized nitrogen, and others.

In some embodiments, the silicone can be in the form of a silicone emulsion. In one embodiment, the silicone particle size can be in the range of from about 1 nm to about 100 microns, or from about 10 nm to about 10 microns. The silicone can include microemulsions (particle size <150 nm), standard emulsions (particle size of about 200 nm to about 500 nm) and/or macroemulsions (particle size of about 1 micron to about 20 microns).

In some embodiments, the silicone is present in the treatment composition from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment composition.

In some embodiments, the silicone is present in the ball in an amount from about 0.5 g to about 5.0 g, or from about 1.0 g to about 5.0 g, or from about 1 g to about 4.5 g, or from about 2 g to about 4.5 g, or from about 3 g to about 5 g, or from about 3 g to about 4.5 g, based on the total weight of the ball.

Anti-Static Agent

In some embodiments, a single treatment agent can provide one of or both softening and anti-static benefits. In one embodiment, the softening and/or antistatic agent can be an ester quaternary ammonium compound including those already described herein.

Anti-Wrinkling Agent

In some embodiments, the treatment agent can include an anti-wrinkling agent. In one embodiment, the anti-wrinkling agent can include a silicone, as disclosed herein with respect to other aspects of the invention, or a siloxane containing compound. In one embodiment, the anti-wrinkling agent can be a quaternary ammonium compound, as disclosed herein. Suitable anti-wrinkling agents include polydimethylsiloxane diquaternary ammonium, silicone copolyol fatty quaternary ammonium, and polydimethyl siloxane with polyoxyalkylenes.

In some embodiments, the anti-wrinkling agent is present in the treatment composition from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment composition In some embodiments, the anti-wrinkling agent is present in/on the ball in an amount from about 0.1 g to about 8.0 g, or from about 0.5 g to about 7.0 g, or from about 1 g to about 6 g, or from about 2 g to about 5 g, or from about 3 g to about 5 g, or from about 4 g to about 5 g, based on the total weight of the ball.

Color Protection

In some embodiments, the treatment agent can include a color protection agent, e.g., a dye transfer inhibitor. Dye transfer inhibitors are typically used to prevent dye from dissolving or transferring to the wash liquor or other fabrics during washing and/or cleaning of dyed fabrics. Suitable dye transfer inhibitors include but are not limited to polymers or a copolymer of cyclic amines such as vinylpyrrolidone and/or vinylimidazole, polyvinylpyrrolidone (PVP), polyvinylimidazole (PVI), copolymers of vinylpyrrolidone and vinylimidazole (PVP/PVI), polyvinylpyridine-N-oxide, poly-N-carboxymethyl-4-vinylpyridium chloride and mixtures thereof. Additional suitable color protection agents include but are not limited to quaternary ammonium compounds such as di-(nortallow carboxyethyl) hydroxyethyl methyl ammonium methyl sulfate, and surfactants.

Uv Protection

In some embodiments, the treatment agent can include a UV protection agent.

In some embodiments, the UV protection agent is present in the treatment composition from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment composition In some embodiments, the UV protection agent is present on/in the ball in an amount from about 0.1 g to about 8.0 g, or from about 0.5 g to about 7.0 g, or from about 1 g to about 6 g, or from about 2 g to about 5 g, or from about 3 g to about 5 g, or from about 4 g to about 5 g, based on the total weight of the ball.

Anti-Pilling

In some embodiments, the treatment agent can include an anti-pilling agent. Suitable commercially available anti-pilling agents include but are not limited to enzymes such as cellulase enzymes.

In some embodiments, the anti-pilling agent is present in the treatment composition from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment composition In some embodiments, the anti-pilling agent is present on/in the ball in an amount from about 0.1 g to about 8.0 g, or from about 0.5 g to about 7.0 g, or from about 1 g to about 6 g, or from about 2 g to about 5 g, or from about 3 g to about 5 g, or from about 4 g to about 5 g, based on the total weight of the ball.

Disinfecting/Sanitizing

In some embodiments, the treatment agent can include a disinfecting and/or sanitizing agent. Suitable sanitizing and/or disinfecting agents include but are not limited to quaternary ammonium compounds such as alkyl dimethylbenzyl ammonium chloride, alkyl dimethylethylbenzyl ammonium chloride, octyl decyldimethyl ammonium chloride, dioctyl dimethyl ammonium chloride, and didecyl dimethyl ammonium chloride.

In some embodiments, the disinfecting/sanitizing agent is present in the treatment composition from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment composition In some embodiments, the disinfecting and/or sanitizing agent is present on/in the ball in an amount from about 0.1 g to about 8.0 g, or from about 0.5 g to about 7.0 g, or from about 1 g to about 6 g, or from about 2 g to about 5 g, or from about 3 g to about 5 g, or from about 4 g to about 5 g, based on the total weight of the ball.

Scouring Agent

In some embodiments, the treatment agent can include a souring agent that neutralizes residual alkaline that may be present on the fabric. The souring agents can be used to control the pH of the fabric. Suitable souring agents include but are not limited to acids such as saturated fatty acids, dicarboxylic acids, and tricarboxylic acids, such as those that remain solid under conditions of operation in the dryer.

In some embodiments, the scouring agent is present in the treatment composition from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment composition In some embodiments, the souring agent is present on/in the ball in an amount from about 0.1 g to about 8.0 g, or from about 0.5 g to about 7.0 g, or from about 1 g to about 6 g, or from about 2 g to about 5 g, or from about 3 g to about 5 g, or from about 4 g to about 5 g, based on the total weight of the ball.

Mosquito Repellant

In some embodiments, the treatment agent can include repellents such as mosquito repellents.

In some embodiments, the mosquito repellant is present in the treatment composition from about 0.1 wt. % to about 20 wt. %, or from about 0.5 wt. % to about 20 wt. %, or from about 0.5 wt. % to about 15 wt. %, or from about 1 wt. % to about 15 wt. %, based on the volume of the treatment composition In some embodiments, the repellent is present on/in the ball in an amount from about 0.1 g to about 8.0 g, or from about 0.5 g to about 7.0 g, or from about 1 g to about 6 g, or from about 2 g to about 5 g, or from about 3 g to about 5 g, or from about 4 g to about 5 g, based on the total weight of the ball.

Additional suitable fabric treatment agents are disclosed in U.S. Pat. No. 7,456,145, which is herein incorporated by reference in its entirety.

Kits Comprising the Device

In some embodiments, a kit may include one or more dryer balls 14 (e.g., wool, plastic, or rubber) and the treatment composition to be disposed on the one or more dryer balls. In some embodiments, the kit includes one or more balls 14 pretreated with a first treatment composition 12. In some embodiments, the kit further includes a container (e.g., a pour bottle, squirt bottle, spray bottle, etc.) confining a volume of a second treatment composition for disposing on the one or more balls 14, and an applicator 19. This may be used, for example, to "re-charge" the balls with the treatment composition or add an additional treatment agent to the ball.

In certain embodiments, the kit contains 3 balls. In other embodiments, the kit contains 4 balls.

In some embodiments, the second treatment composition is different than the first treatment composition. In some embodiments, the second treatment composition is the same as the first treatment composition.

Methods of Use

Figure 5:
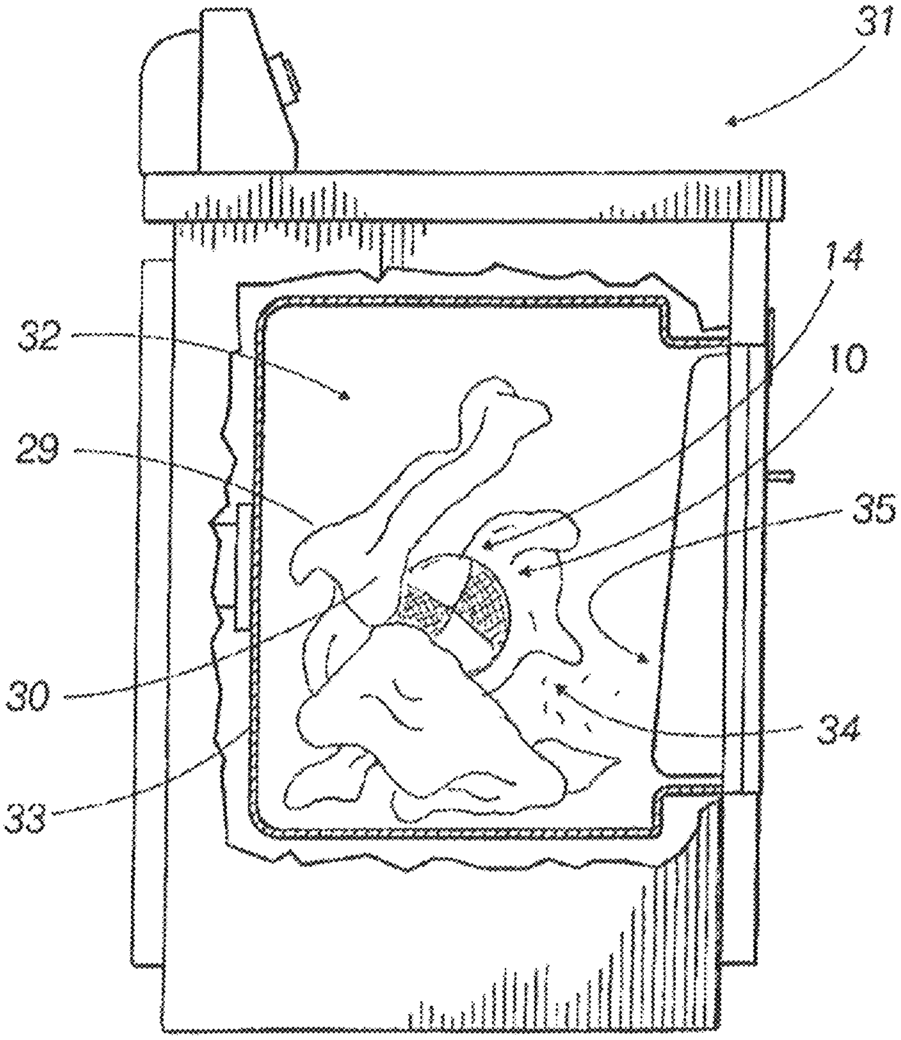
FIG. 5 depicts the embodiment of FIG. 1 and fabric articles within an operating tumble-type clothes dryer.

Treating a fabric or textile can refer to, for example, one or more of: i) softening a textile; ii) applying a perfume to a textile; iii) applying a perfume to and softening a textile; iv) rendering the textile resistant to static build up during drying; or any combination thereof. FIG. 5 illustrates an exemplary method for treating a fabric or textile using the illustrative absorbent substrate 10. The method involves placing the substrate 10 inside a tumble-type clothes dryer 31 along with one or more fabric articles 29. Preferably, a plurality of balls 14 are placed in the dryer, most preferably, 3-4 balls 14. The fabric may be covered at least partially with adherent matter 30, such as pet hair, lint, or other fine material, prior to the beginning of the drying cycle. A treated dryer ball 14 is added to a dryer 31 prior to drying a garment 30, where the dryer ball 14 includes the treatment composition 12 as described above. The garment and dryer ball 14 then pass through a drying cycle in the dryer such that the device 14 tosses along with the fabric articles 29, helping to separate them and repeatedly making contact. In addition to releasing fragrance, the dryer ball 10 may provide a physical benefit in the dryer by reducing or preventing the garment from "clumping" in the dryer. As the dislodged matter 34 is pulled away from the fabric articles and/or the dryer ball 14, it is drawn toward the dryer vent 35 where it is deposited on the lint trap. Contact between the dryer ball 14 and the drum 33 and fabric articles 29 may advantageously cause the general buildup of an electrostatic on the dryer ball 14 that may be useful in helping to draw the partially dislodged matter away from the fabric articles to facilitate their removal from the drying chamber 32. The dryer ball 14 may also retain heat that is transferred to the garment, which may aid in the drying process. When the drying cycle is completed, the dryer ball 14 is typically removed from the drying chamber 32.

In one embodiment, the method further includes running the dryer on a nonheated (i.e., fluff) cycle.

In certain embodiments, the method releases fragrance onto textiles in the dryer. In certain embodiments, a ball delivers about 25 mg to about 1 g fragrance to textiles in a drying cycle. In certain embodiments, a ball delivers about 100 mg to about 500 mg of fragrance, more preferably about 120 mg to about 250 mg to textiles in a drying cycle.

In some embodiments, a ball delivers about 25 mg to about 500 mg free fragrance to textiles in a drying cycle. In certain embodiments, a ball delivers about 50 mg to about 250 mg of free fragrance, more preferably about 70 mg to about 205 mg free fragrance to textiles in a drying cycle.

In certain embodiments, a ball delivers about 50 mg to about 2 g encapsulated fragrance to textiles in a drying cycle. In certain embodiments, a ball delivers about 100 mg to about 1 g of encapsulated fragrance, more preferably about 120 mg to about 500 mg encapsulated fragrance to textiles in a drying cycle.

In some embodiments, about 0.1 to about 4.0 g of fragrance is delivered by one or more balls in a drying cycle. In certain embodiments, about 0.4 to about 2.0 g, more preferably about 0.5 to about 1.0 g of fragrance is delivered by one or more balls in a drying cycle.

In certain embodiments about 100 mg to about 2 g free fragrance is delivered by one or more balls in a drying cycle. More preferably, about 200 mg to about 1 g of free fragrance, more preferably about 250 mg to about 850 mg free fragrance is delivered by one or more balls in a drying cycle.

In some embodiments, about 200 mg to about 8 g encapsulated fragrance is delivered by one or more balls in a drying cycle. In certain embodiments, about 400 mg to about 4 g of encapsulated fragrance, more preferably about 450 mg to about 1 g encapsulated fragrance is delivered by one or more balls in a drying cycle.

The absorbent substrate 10 provides a both a fragrance and mechanical benefit in the drying cycle of the dryer. Moreover, the fragrance benefit can continue for up to 7 days, more preferably up to 1 month, most preferably up to 3 months. Without wishing to be bound by theory, the encapsulated fragrance is released when the fabric is rubbed by a user after it has been removed from the dryer. The treatment composition contains sufficient amounts of free and encapsulated fragrance to deliver a noticeable scent to the consumer for up to a month after laundering.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

EXAMPLES

Example 1: Composition 500 g of a suspension having the composition in Table 1 was prepared by mixing the ingredients with a mixer at 4500 rpm for 3 minutes.

TABLE 1

| Treatment Composition | | | |
|---|---|---|---|
| Component | % Activity | Wt. % | Wt. (g) |
| DI water | 100.0 | 84.90 | 424.47 |
| PEG-80 sorbitan laurate | 71.4 | 3.50 | 17.51 |
| Fragrance Oil | 100.0 | 1.70 | 8.50 |
| Encapsulated Fragrance Suspension (30%) | 100.0 | 8.00 | 40.00 |
| HASE Rheology modifier | 30.0 | 1.63 | 8.17 |
| Triethylamine | 85.0 | 0.27 | 1.35 |

Example 2: Comparator Formulas

2A: Snuggle® Blue Sparkle® Dryer Sheets. These dryer sheets had a similar fragrance scent profile to the fragrances used in Composition 1.

2B: No encapsulated fragrance. This formula included 2% free fragrance and no encapsulated fragrance suspension.

Example 3: Loading onto Dryer Balls

The composition of Examples 1 and 2 were applied to the surface of unscented wool balls having an average dry weight 80-100 g using a spray bottle with a wet-basis add on target of 6 g.

The loaded balls were weighed on a lab scale within 5 minutes after application of the treatment composition. Bags were stored in open air, in plastic bags and in Mylar bags. The weight of the balls was recorded after 24 hours of storage. The results are shown in Table 2.

TABLE 2

| Sample Wool Ball | Initial Weight (g) | Weight After Formula Application (g) | Weight After 24 h Storage (g) |
|---|---|---|---|
| 1—Open Air Dry | 82.96 | 88.74 | 83.24 |
| 2—Open Air Dry | 93.81 | 99.67 | 93.78 |
| 3—Plastic Bag | 93.94 | 99.51 | 99.27 |
| 4—Plastic Bag | 81.00 | 86.98 | 86.69 |
| 5—Mylar Bag | 90.69 | 96.66 | 96.46 |
| 6—Mylar Bag | 93.47 | 99.45 | 99.32 |

Balls stored in plastic and Mylar bags lost minimal amounts of treatment composition. In contrast, balls stored at ambient conditions appeared to lose a large portion to all of the treatment composition.

Example 4: Drying Procedure

A MAYTAG® Epic Z electric tumble clothes dryer capable of internal temperatures up to approximately 150° F. was used for experiments. The test fabrics were 12"×12" 100% Cotton, terry towels. Sixty towels were washed with All® free clear detergent then tumbled with 4 wool balls of Example 3, loaded with the treatment composition of Example 1, for 60 minutes. A cycle with unscented wool balls was run as a comparison.

Example 5: Fragrance Intensity Rating

A panel of 10-15 (different panels overall), including a mix of trained and untrained "average consumers", rated the smell of the towels laundered and dried according to Example 4 at various time points (fresh dry, 7 days, 1 month). An intensity rating of 0-10 was awarded before and after rubbing the towels with 10 being the highest intensity and 0 being no fragrance detected.

Results are shown in Table 3. An average of 5 consumer ratings was used for each data point. The consumers were randomly selected at each timepoint.

TABLE 3

Fragrance Intensity Ratings

| Time/Rub | Treatment Composition 2A | None - Unscented | 1 | 2B |
|---|---|---|---|---|
| Fresh Dry Pre-Rub | 3 | 0 | 6.4 | 4.6 |
| Fresh Dry Post-Rub | 3 | 0.2 | 6.4 | 4.8 |
| 7-Day Dry Pre-Rub | 1.6 | 0 | 5 | 4.4 |
| 7-Day Dry Post-Rub | 1.8 | 0 | 6.2 | 4.4 |
| 1 Month Dry Pre-Rub | 4.6 | 0.6 | 4.8 | 4.6 |
| 1 Month Dry Post-Rub | 5.2 | 0.6 | 6.6 | 5.4 |

Figure 6:
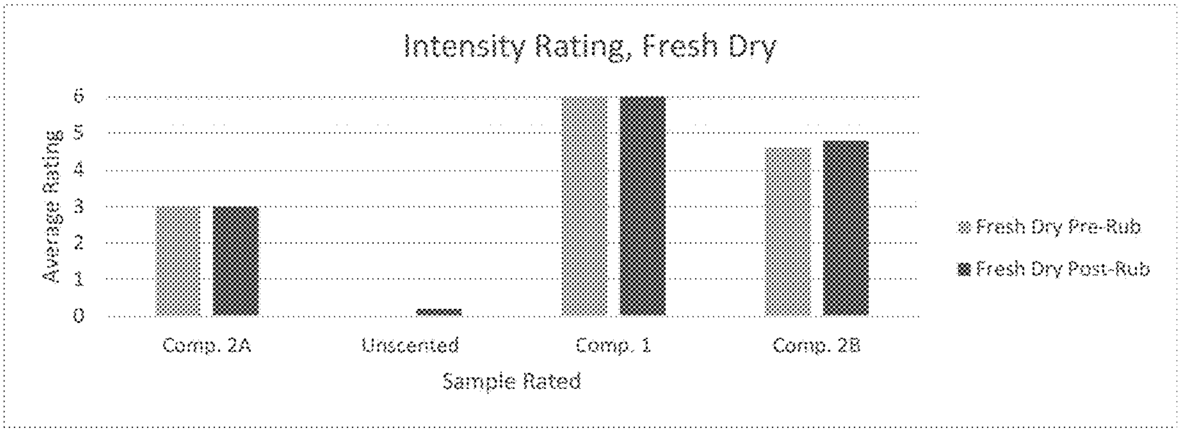
FIG. 6 is bar chart showing pre- and post-rub fragrance intensity ratings for fabrics tumble dried with a treated dryer ball.

FIG. 6 shows that fabrics tumble dried with balls including free+encapsulated fragrance (1) receive the highest fragrance intensity rating when fresh from the dryer as compared to lesser intensity ratings for towels tumbled with balls containing only free fragrance or tumbled with benchmark dryer sheets. The dryer sheets (2A) and balls having only free fragrance (2B) received similar ratings. A negligible difference in the fragrance intensity for each fragrance system was observed due to rubbing.

Figure 7:
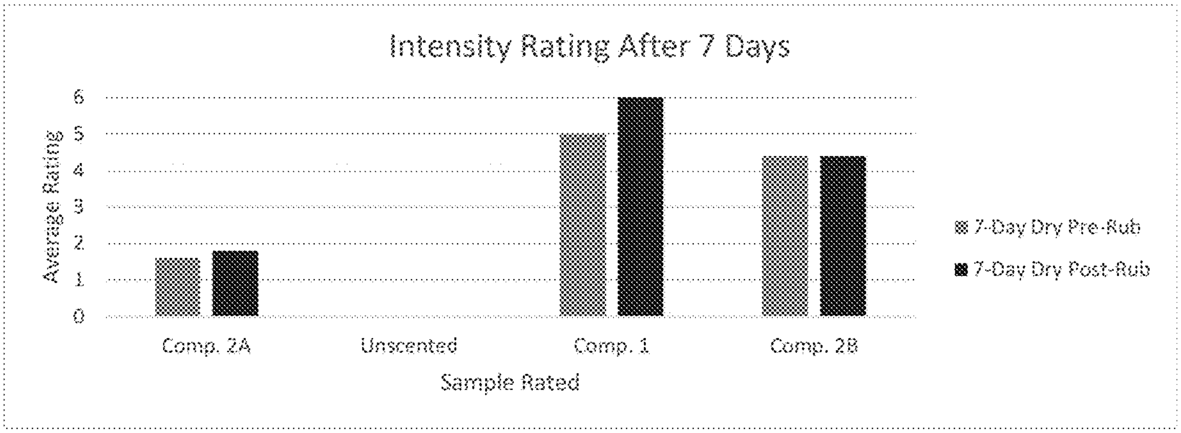
FIG. 7 is bar chart showing pre- and post-rub fragrance intensity ratings after 7 days for fabrics tumble dried with a treated a dryer ball.
Figure 8:
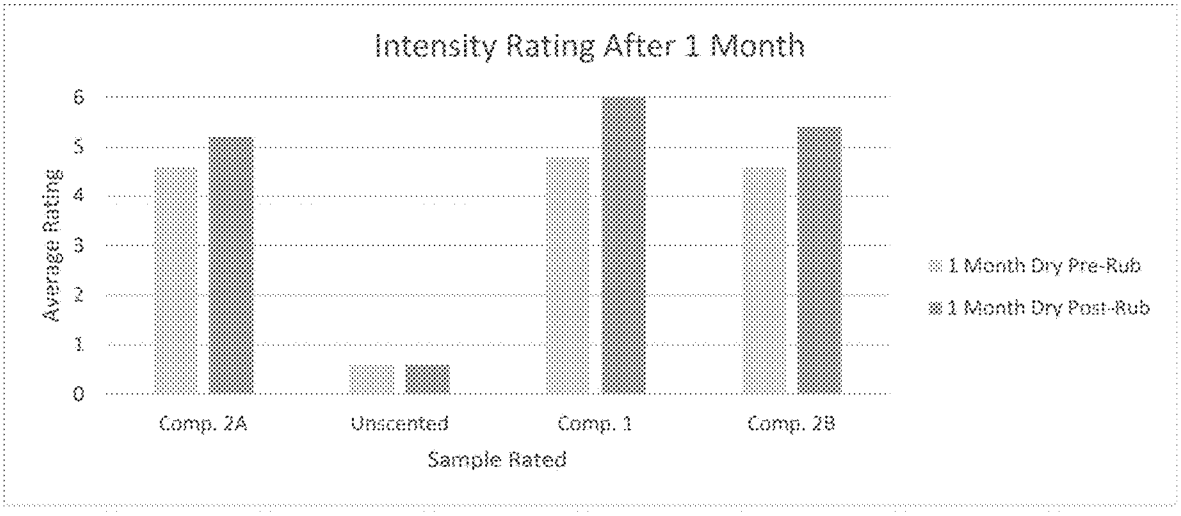
FIG. 8 is bar chart showing pre- and post-rub fragrance intensity ratings after 1-month days for fabrics tumble dried with a treated dryer ball.

FIGS. 7 and 8 show that fabrics dried with the inventive devices (1) maintain fragrance intensity rating up to 1 month and that rubbing towels at later timepoints is able to provide a "burst" of fragrance that is observed with free fragrance products.

Example 6: Composition

Alternative formulas having the compositions in Table 4 were prepared by mixing the ingredients with a mixer at 4500 rpm for 3 minutes.

TABLE 4

Treatment Compositions

| Component | % Activity | 6A Wt. % | 6B - SF Wt. % | 6C | 6D |
|---|---|---|---|---|---|
| DI water | 100.0 | 90.78 | 88.78 | 89.58 | 79.08 |
| PEG-80 sorbitan laurate | 71.4 | 2.50 | 2.50 | 2.50 | 2.50 |
| Fragrance Oil | 100.0 | 1.00 | 4.00 | 2.4 | 1.7 |
| Encapsulated Fragrance Suspension (30%) | 100.0 | 5.00 | 4.00 | 4.8 | 16.0 |
| HASE Rheology modifier | 30.0 | 0.49 | 0.49 | 0.49 | 0.49 |
| Triethylamine | 85.0 | 0.23 | 0.23 | 0.23 | 0.23 |

Example 7: Stability Study

The weight of 4 balls containing 6 grams of treatment Composition 1 and 6 grams of Composition 6B were measured after storage (no secondary containment) at various temperatures at 0, 1, 2 3, and 4 weeks. Results for composition 1 are shown in Table 5 and for composition 6B in Table 6.

TABLE 5

Weight of balls (g)

| Ball Number | Temperature (° C.) | Initial | Week 1 | Week 2 | Week 3 | Week 4 |
|---|---|---|---|---|---|---|
| 1 | 4 | 97.06 | 98.68 | 97.43 | 97.3 | 97.5 |
| 2 | 4 | 99.1 | 99.01 | 99.98 | 99.78 | 99.58 |
| 3 | 4 | 97.73 | 95.03 | 95.43 | 95.4 | 94.57 |
| 4 | 4 | 100.9 | 100.7 | 100.72 | 100.72 | 100.61 |
| 1 | 25 | 81.07 | 80.66 | 89.59 | 88.41 | 88.26 |
| 2 | 25 | 90.73 | 89.6 | 90.42 | 89.21 | 89.25 |
| 3 | 25 | 91.57 | 91.56 | 94.44 | 91.24 | 91.1 |
| 4 | 25 | 91.36 | 91.09 | 94.57 | 93.46 | 93.47 |
| 1 | 40 | 90.52 | 85.56 | 86.11 | 85 | 84.91 |
| 2 | 40 | 90.6 | 89.36 | 89.82 | 88.61 | 88.64 |
| 3 | 40 | 92.75 | 93.57 | 93.76 | 92.54 | 92.53 |
| 4 | 40 | 92.09 | 90.04 | 90.31 | 88.98 | 89.08 |
| 1 | 45 | 86.73 | 85.2 | 86.98 | 84.34 | 84.15 |
| 2 | 45 | 80.8 | 78.29 | 86.76 | 77.33 | 77.37 |
| 3 | 45 | 90.57 | 87.57 | 88.86 | 86.43 | 86.42 |
| 4 | 45 | 91.12 | 85.78 | 93.21 | 84.86 | 84.78 |
| 1 | 50 | 91.72 | 85.94 | 85.87 | 84.58 | 84.72 |
| 2 | 50 | 86.59 | 77.74 | 77.92 | 76.7 | 76.92 |
| 3 | 50 | 90.56 | 81.42 | 81.75 | 80.45 | 80.41 |
| 4 | 50 | 92.1 | 85.68 | 86.15 | 84.59 | 84.68 |

TABLE 6

Weight of balls (g)

| Ball Number | Temperature (° C.) | Initial | Week 1 | Week 2 | Week 3 | Week 4 |
|---|---|---|---|---|---|---|
| 1 | 4 | 101.51 | 101.49 | 102.26 | 101.99 | 101.85 |
| 2 | 4 | 99.01 | 98.68 | 99.67 | 99.67 | 100 |
| 3 | 4 | 90.68 | 90.66 | 90.97 | 90.7 | 90.45 |
| 4 | 4 | 95.96 | 94.98 | 94.7 | 94.75 | 94.85 |
| 1 | 25 | 96.77 | 92.42 | 93.1 | 92.02 | 91.97 |
| 2 | 25 | 87.69 | 85.04 | 85.76 | 84.61 | 84.61 |
| 3 | 25 | 92.06 | 91.56 | 92 | 90.84 | 90.83 |
| 4 | 25 | 92.01 | 89.77 | 90.15 | 89.03 | 88.93 |
| 1 | 40 | 91.34 | 88.19 | 89.11 | 87.73 | 87.73 |
| 2 | 40 | 95.53 | 87.72 | 88.4 | 87.15 | 87.11 |
| 3 | 40 | 90.25 | 85.92 | 86.52 | 85.22 | 85.24 |
| 4 | 40 | 94.89 | 89.6 | 89.79 | 88.44 | 88.53 |
| 1 | 45 | 94.23 | 87 | 85.54 | 86.19 | 85.73 |

TABLE 6-continued

| | | Weight of balls (g) | | | | |
|---|---|---|---|---|---|---|
| Ball Number | Temperature (° C.) | Initial | Week 1 | Week 2 | Week 3 | Week 4 |
| 2 | 45 | 92.76 | 87.29 | 78.45 | 86.07 | 85.91 |
| 3 | 45 | 86.58 | 89.21 | 87.86 | 87.91 | 87.69 |
| 4 | 45 | 97.98 | 94.12 | 85.98 | 92.13 | 92.04 |
| 1 | 50 | 92.57 | 89.25 | 88.97 | 87.94 | 87.53 |
| 2 | 50 | 92.03 | 88.2 | 88.09 | 86.76 | 86.48 |
| 3 | 50 | 93.48 | 88.05 | 87.2 | 85.85 | 85.88 |
| 4 | 50 | 92.15 | 78.13 | 77.45 | 76.32 | 76.17 |

Having described the invention with reference to a particular composition and the like, it will be apparent to those of skill in the art that it is not intended that the invention be limited by such embodiments, and that modifications can be made without departing from the scope of the invention.

What is claimed is:

1. A kit for treating textiles in a dryer comprising:

one or more absorbent wool balls;

an aqueous treatment composition comprising free fragrance, encapsulated fragrance, and an aqueous carrier; and an applicator for applying the aqueous treatment composition onto or within the absorbent wool ball.

2. The kit of claim 1, wherein the applicator is selected from the group consisting of a sprayer, a dropper, and a syringe.

3. The kit of claim 1, wherein the free fragrance is provided in an amount of about 0.1 wt. % to about 5 wt. % of the treatment composition; the encapsulated fragrance is provided in an amount of about 0.1 wt. % to about 10 wt. % of the treatment composition, and the aqueous carrier is provided in an amount of about 80 wt. % or more of the treatment composition.

4. The kit of claim 3, wherein the treatment composition has a ratio of free fragrance to encapsulated fragrance of about 1:0.3 to 1:2.

5. The kit of claim 2, wherein the applicator is capable of dispensing about 4 to about 15 grams of the treatment composition to the absorbent wool ball with each application.

6. The kit of claim 5, wherein the applicator dispenses an amount of treatment composition sufficient to provide one absorbent wool ball with about 0.02% to about 2.0% by weight of free fragrance and about 0.005% to about 2.5% by weight of encapsulated fragrance, based on a total weight of the wool ball without fragrance.

7. The kit of claim 1, wherein the treatment composition additionally comprises one or more of: a suspending polymer, a neutralizing agent, an emulsifier, an odor capturing agent, a softening agent, an anti-static agent, a color protection agent, a UV protector, an anti-pilling agent, a disinfecting/sanitizing agent, a scouring agent, and a mosquito repellant, a colorant, a salt, or any combination thereof.

* * * * *